March 16, 1943. A. C. LUSHER ET AL 2,314,002
METHOD FOR MANUFACTURING AND ASSEMBLING HIGH PRESSURE COUPLINGS
Filed Dec. 3, 1941 2 Sheets-Sheet 1

Inventors
Albert C. Lusher, Emerson H. Tompkins,
Frederick R. Reutter and George G. Howard
by Mawhinney & Mawhinney
Attorneys

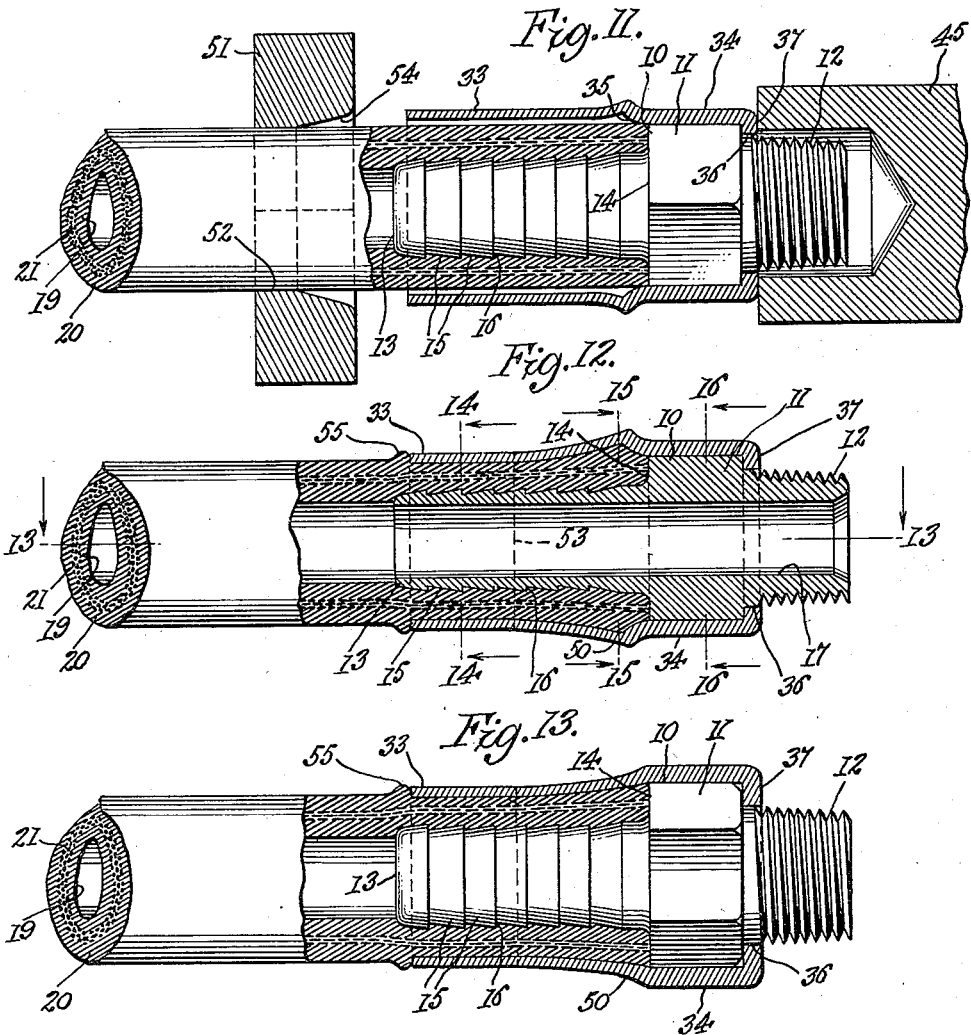

Patented Mar. 16, 1943

2,314,002

UNITED STATES PATENT OFFICE 2,314,002

METHOD FOR MANUFACTURING AND ASSEMBLING HIGH PRESSURE COUPLINGS

Albert C. Lusher, Emerson H. Tompkins, Frederick R. Reutter, and George G. Howard, Waterbury, Conn., assignors to Scoville Manufacturing Company, Waterbury, Conn., a corporation of Connecticut Application December 3, 1941, Serial No. 421,520

8 Claims. (Cl. 29—157)

The present invention relates to improvements in methods for manufacturing and assembling high pressure couplings, and involves certain improvements over the disclosure in copending application entitled High pressure hose couplings, Serial Number 367,302, filed November 26, 1940, by Albert C. Lusher and Allan C. Hoffman.

This is a companion case, covering the method of manufacture and assembly, to an application executed of even date herewith entitled High pressure hose couplings, Serial Number 421,519, filed December 3, 1941, in the names of Albert C Lusher, Emerson H. Tompkins, and George G. Howard.

An object of the invention is to provide an improved method of manufacture of the parts of high pressure hose couplings and of the subsequent assembly of the parts to provide a substantially leak-proof joint between the hose and coupling and a joint which will not readily separate having regard to the very high pressures carried in hose under present day conditions.

It is a further object of the invention to provide an improved method of manufacture and assembly of high pressure hose couplings to effect substantial economies in materials and manufacturing costs without sacrificing any of the desirable characteristics sought in the performance of the coupling ultimately united to the hose, and which in fact secures a superior strength of connection between the hose and coupling and long life in satisfactory service.

A further object of the invention is to provide an improved method of manufacture and assembly of high pressure hose couplings in which the steps of manufacture and assembly are simple and contribute to a high degree of tenacity and retention with respect to the coupling on the hose to carry high pressures without liability of the coupling "blowing off" the end of the hose.

A still further object of the invention is to provide an improved method by virtue of which the binding part of a high pressure coupling may for the most part be made of light weight sheet metal materials which lend themselves readily to die contracting operations through which results an easy assembly of the coupling to the end of the hose.

The improved method also has for a further object to secure the coupling to the high pressure hose without the necessity of having to strip the outer layer of covering material of the hose down to the reinforcing wire braiding or mesh customarily found disposed intermediately in high pressure hose.

The invention further contemplates an improved method of which separately manufactured parts of a hose coupling are united into a single article of commerce for transportation and sale in that condition for ready assembly to the end of a hose; which method consists also in an initial die contracting operation which secures the initial assembly above referred to, succeeded by a final die contracting operation in which an outer malleable sleeve member of the preassembled commercial article is constricted about the assembled end of the hose to squeeze the hose on the coupling nipple and into the buttress teeth thereof, in case such are provided, and wherein the rubber or other similar material of the hose is extruded by the final die contracting operation into a diametrically relatively enlarged chamber at the inner portion of the sleeve to further assist in interlocking the coupling upon the hose end.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal sectional view taken through a form of coupling sleeve utilized in connection with the present invention.

Figure 11 is a side view of the coupling body with the assembled sleeve in longitudinal section and a hose having parts broken away and in section with an anvil and a final die illustrated in section in readiness to finally die contract the sleeve on the hose.

Figure 12 is a longitudinal section taken through a coupling body, sleeve and hose end in the final position of the coupling on the hose.

Figure 13 is a similar view taken on the line 13—13 in Figure 12.

Figure 2:
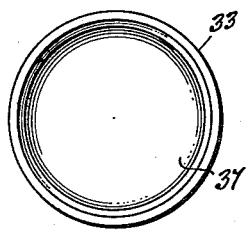
Figure 2 is an end view of the same looking at the left end in Figure 1.

Figures 14, 15 and 16 are cross sections taken on the lines 14—14, 15—15 and 16—16 respectively of Figure 12.

Referring more particularly to the drawings 10 designates generally a coupling body constructed with an intermediate enlarged nut or polygonal portion 11 having an externally screw threaded male member 12 projecting from one side thereof and a nipple 13 extending axially from the other side of such nut or polygonal portion 11. The nipple 13 is of greatly reduced external diameter as compared with the external diameter of the nut portion 11, leaving an abutment wall 14 that is substantially vertical or substantially normal to the coupling axis.

Along the exterior of the nipple 13 are provided a series of buttress teeth 15 which taper toward the outer free end of the nipple 13 and provide the usual abrupt shoulders 16 disposed away from the free end of said nipple. As shown in Figure 12, in the coupling body is a through opening or bore 17 in the customary manner.

As shown more particularly in Figures 11 to 15 inclusive, the hose illustrated is that well known form consisting of the inner and outer concentric layers 19 and 20 with an intermediate embedded concentric layer of wire mesh or other reinforcement 21.

A sleeve 33 is adapted to be slipped over the coupling body and is formed with a nut or polygonal portion 34 to mate with the polygonal portion 11 of the coupling body 10. Adjoining the nut portion the sleeve is originally bulged out slightly, as indicated at 35 in Figure 8, to enable the main cylindrical body of the sleeve 33, exclusive of the nut portion 34, to be of an initially large diameter subject to being contracted upon the coupling and hose. The polygonal portion 34 of the sleeve carries a flange or base 37 with an opening 36 to fit over the male end 12 of the coupling body.

In Figure 11 is illustrated an anvil member 45 for aiding in the assembly of the coupling parts and of the assembly of the coupling to the hose.

Figure 8:
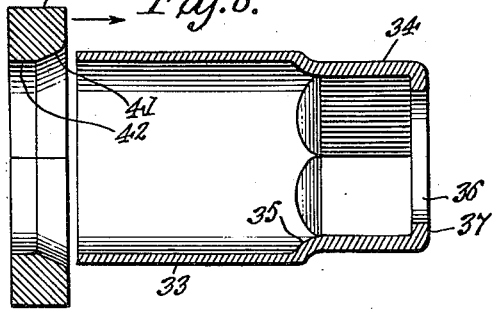
Figure 8 is a view similar to Figure 5 but taken at right angles thereto on the line 8—8 of Figure 6 and also illustrating the initial contracting die.
Figure 4:
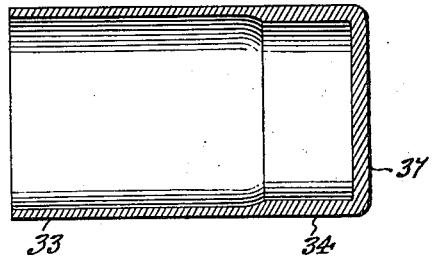
Figure 4 is a view similar to Figure 1 of the same sleeve in a subsequent phase of production following a planishing operation.

In Figure 8 is illustrated a split die 40 having an opening 42 to pass over the sleeve 33, said die 40 having preferably a flaring mouth 41 at its leading end for the purpose of engaging and die contracting the sleeve 33 as the die 40 is moved relatively to such sleeve in the direction of the arrow indicated in Figure 8.

Figure 9:
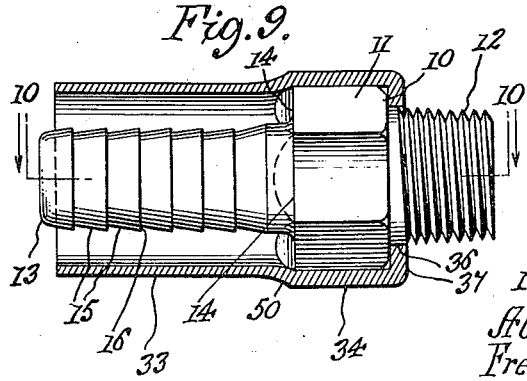
Figure 9 is a side view of a coupling member with sleeve assembled thereon subsequent to initial die contraction and taken through the corner portions or high points of the nut section of the coupling body similar to the line 5—5 in Figure 6.
Figure 10:
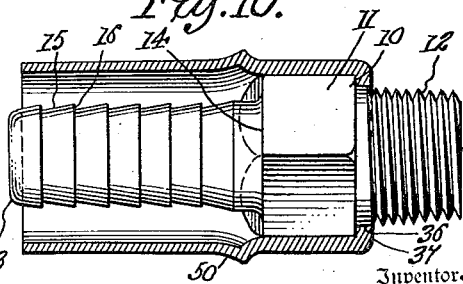
Figure 10 is a view similar to Figure 9 but taken on the line 10—10 in Figure 9 through the flat sides of the polygonal portion of the coupling.

The die 40 in Figure 8 is the initial die and its opening 42 is of such diameter as to only slightly contract the sleeve 33, for instance to the relative diameter shown in Figures 9, 10 and 11, where the reduction, indicated at 50, is somewhat less than the corners or ridges of the nut portion 11 of the coupling body. Thus the flange or base 37 at one side and the crimp or reduction 50 at the other side of the polygonal portion 11 serve to retain the sleeve 33 assembled to the coupling body as a composite article which may be shipped independently of the hose and sold as an article quite apart from the hose for subsequent assembly with the hose in the hands of the user. This preassembled condition of the coupling body and sleeve is illustrated in Figures 9 and 10.

In Figure 11 is shown a second split or other die 51 having a die opening 52 which is of somewhat smaller diameter than the opening 42 of the initial die 40 for the purpose of further contracting the sleeve 33 from the condition shown in Figure 11 to that shown in Figures 12 to 16 inclusive. The sleeve 33 is preferably a drawn shell of an appropriate metal having high malleability or high ductility and strength. The sequence of the drawing operations is indicated to some extent in Figures 1 to 8 inclusive which illustrate different states of fabrication.

Figure 1:
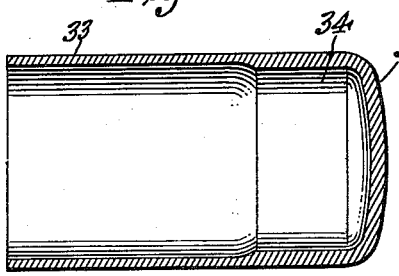
Figure 3:
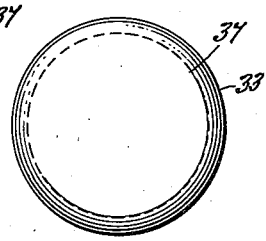
Figure 3 is an end view looking from the right end of Figure 1.
Figure 6:
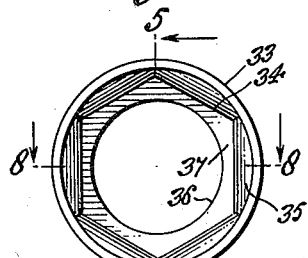
Figure 6 is an end view looking from the left end of Figure 5.

The shell may be initially drawn in the condition shown in Figures 1, 2 and 3 in which there may be differences in thickness of metal wall in the cylindrical or skirt portion 33, the part, originally cylindrical, which is to become the polygonal portion 34 and the end wall which is to become the base or flange 37. The thinness of wall in the cylinder 33 is desirable to admit of the two die contracting operations but in other parts of the shell greater strength is required particularly in high pressure couplings. The thickness of wall or metal is preferably added internally of the shell. Aside from the fact that greater strength is obtained by the added thickness of metal, still greater strength is obtained in the flange or base wall 37 and its point of connection with the polygonal part 34 by subjecting the base to a flattening or planishing operation after all the annealing operations. Such flattening or planishing operation is in the nature of a hardening process. For this purpose the shell 33 is initially drawn as shown in Figure 1 with a domed base 37; that is the base is concavo-convex with the convexity presented outermost. For the next operation, shown in Figure 4, the dome 37 is flattened out to a plane substantially transverse to the coupling axis, this being done by a planishing operation which rearranges the crystalline structure of the metal, making the same harder and in proportion increasing the strength of the metal in this particular area.

After the planishing operation the shell is subjected to another drawing or forming operation to produce the nut portion 34 adjacent the base end 37 of the shell. Subsequently there is an additional finish drawing operation for pinching the cylindrical wall 33 of the shell to give added strength to that part. These various operations are additive of strength, particularly at the point where the base 37 of the shell joins into the nut section 34 thereof. After these operations the shell is edged and the base 37 pierced out as at 36, for assembly over the thread attaching portion 12 of the coupling. The planishing operation acts to drive more stock into the annular corner portion between the base 37 and polygonal section 34 and therefore reinforces and strengthens the corner portion where one surface merges into another at a sharp angle; all this being in addition to the rearrangement of the molecular structure which is also due to the planishing operation.

Figure 5:
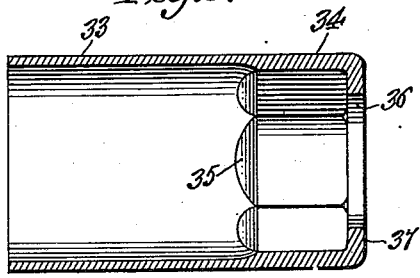
Figure 5 is also a longitudinal sectional view of the same sleeve after being pierced and impressed with its polygonal or nut face section, such section being taken on the line 5—5 of Figure 6.
Figure 7:
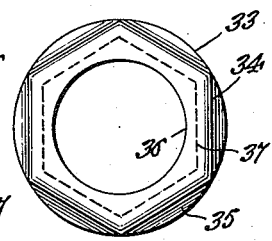
Figure 7 is also an end view looking toward the right end of Figure 5.

Figures 5 and 8 show the state of the shell after it has been pierced at 36 and received its polygonal form 34. The polygonal part 34 in Figure 8 appears reduced over the original diameter of the cylinder or skirt 33, by reason of the fact that this section is taken through the flat portions of opposite nut faces; whereas in Figure 5 the nut portion 34 appears substantially of the same external diameter as that of the sleeve or cylinder 33, which is because the section of Figure 5 is taken through the high points or corner connections between adjacent nut faces.

In the condition shown in Figures 5 and 8 the sleeve is ready to be assembled to the coupling body. This is accomplished by sliding the sleeve 33 over the coupling body with the left end of the sleeve leading and with the flange or base 37 trailing. This flange 37 acts in the capacity of a stop to strike the adjacent wall face of the nut portion 11 which determines the initially assembled condition of these parts. Such condition is shown in Figures 9 and 10. The anvil 45 of Figure 11 may then be inserted over the threaded extension 12 and against the flange 37; while from the opposite end the die 40 of Figure 8 is advanced over the sleeve 33 from the free or outer end of the sleeve 33 toward the interfitting nut portions 11, 34 which accurately and closely fit one another. The die 40 is moved toward the right an appropriate distance axially along the sleeve 33 and it results in initially reducing the diameter of the sleeve 33 to a degree less than the diameter of the nut portion 11, or at least of the corner portions of such nut part 11; resulting in forming the reduction or crimp 50, Figure 9, which thereupon interlocks with the face of the nut portion 11 adjacent the nipple 3. This condition of the parts is shown in Figure 10 and forms a separate article of manufacture and sale.

The subsequent act of assembly is shown in Figure 11 wherein the hose 20 has been slid over the nipple 13 until it engages the wall 14 of the coupling body. The internal diameter of the sleeve 33, as shown in Figure 11, approximates the external diameter of the hose 20 so that the hose may freely enter the well or chamber bound by the nipple 13, sleeve 33 and base wall 14 of the coupling body. The anvil 45 is thereupon applied to the flange 37 to hold the assembled coupling body and sleeve up to the die 51 which is thereupon slid from left toward the right (Figure 11) over the initially contracted sleeve 33 to further contract the same and the included portion of the hose 20 down to a constricted diameter which is preferably somewhat less than the normal external diameter of the hose 20.

The complemental interfitting of the two nut portions 11 and 34 will serve to avoid rotation cf the sleeve 33 relatively to the coupling body. The flange 37 will arrest the axial motion of the sleeve 33 and indicate when the sleeve has been driven home to final position.

The movement of both die members 40 and 51 is from left to right as viewed in Figures 8 and 11 to cause a progressive constriction or radial contraction in the sleeve 33 initial at the free open outer edge thereof and progressing from this free outer open edge toward the nut portion 33 which is essentially non-contracting owing to its close fit about the rigid non-contractile nut portion 11 of the coupling body. The action of both die members causes the radially inward contraction of the metallic sleeve 33 which will be made of a material admitting of this contraction and of a sufficiently rigid body that on such contraction will withstand the outwardly bulging pressure of the hose.

With the initial die 40 (Figure 8), such die may approach very closely to the nut portion 34, and in fact the flared mouth 41 may partly overlap the nut portion 34 in the final position of the die 40 in order to secure the contraction of the sleeve 33 up close to the wall 14 of the coupling body. However, it is not so necessary that the final die 51 approach so closely to the nut portion 34, but the constricting opening 52 of die 51 may with satisfactory results reach a position indicated roughly by line 53 in Figure 12. Of course the flaring mouth 54 of the final die 51 (Figure 11) may be to the right of this line 53 in the final position of the die which will enable the cylindrical wall of the sleeve 33 to assume the final position shown generally in Figures 12 and 13, in which the intermediate part of the sleeve flares or inclines outwardly to a progressively enlarging diameter toward the nut portion 34 from the left end portion of the sleeve which is the portion subjected to maximum contraction. However, those skilled in the art may wish to vary the degree of traverse or lineal movement of the die 51 axially along the sleeve 33 in accordance with differing conditions, differing metals in the sleeve 33 and different types and materials in the hose parts.

The high pressure hose will ordinarily be of a material which is relatively thick with an intermediate filler of numerous interwoven layers of wire strands 21. The inner layer 19 of the hose will become firmly clamped upon the buttress teeth 15, such inner layer being squeezed by the contraction of the sleeve 33 so that it will enter the spaces beyond the shoulders of the buttress teeth 16, forming a tight gripping engagement therewith resisting axial displacement of the coupling body from the hose.

It will be appreciated that the improved coupling acts to interlock the parts so as to prevent axial displacement of the parts relative to each other, as well as the hose relative to the coupling. The ability of the coupling parts to hold securely against axial strain results from the construction and relative arrangement of the parts in the combination and the steps of the method of manufacture and assembly. The axial strains which the present invention has been designed to cope with are not so much external pulling on the hose or on the coupling as those which result from the internal high pressure force that is transmitted through the hose. Such internal high pressure force, as for instance in grease guns, tends to blow the coupling off the end of the hose and the improved high pressure coupling is designed and built to withstand such shock and simultaneously to be leak-proof.

Another advantage derived from the novel form of construction and method of manufacture and assembly is that the parts can be made of different materials depending upon the conditions to which the couplings are subjected. Such concept is new in relation to high pressure couplings now on the market which are made of one piece. Such one piece couplings are either turned out from solid rod or made by a forging process; in both cases presenting a kind of material that is difficult to deform. In the present instance there is no need to deform the body part, but the outside sleeve, which is to be deformed, can be selected of a material that is fit for that purpose. Sufficient strength can readily be incorporated into the sleeve member. Where the coupling is to be used in airplanes, both body and shell parts may be made of aluminum. In case the coupling is to be subjected to a highly abrasive fluid, the body part that will have to withstand the abrasive action may be made of a suitable steel. In this sense the present invention provides flexibleness in the coupling and enables it to readily lend itself to various uses and conditions.

In contracting the outside sleeve 33 in the manner done by forcing the die from the free or outer end toward the anchored nut portion subjects the hose material confined within the coupling to such a tremendous pressure as to cause the compressed hose material to move along in front of the die 51 and eventually spread out radially in the hollow annular cavity encompassed within the portion of the sleeve 33 adjacent the polygonal part 34, this being finally the largest diameter of the sleeve, as shown in Figures 12 and 13. The bulged portion of the rubber forms a further extremely strong interlock between the hose and the coupling.

The present commercial high pressure couplings require that the outside layer of rubber material of the hose be ground or skived off down to the wire mesh and the coupling collapsed directly upon such wire mesh. The present invention obviates any such removal of rubber material and provides means for interlocking the hose to the coupling with strong anchorage. Heretofore high pressure couplings have been made of brass or other deformable material. Such material is not very hard. However, by the arrangement of a separately manufactured sleeve 33 we are enabled to produce the necessary hardness and ductility and malleability in the outside sleeve 33.

The separability of manufacture of the sleeve from the coupling body admits of the use of different materials. The sleeve is made of an alloy of a high copper content to afford a higher degree of malleability and to avoid season cracking which would result in case the sleeve was made of the same material and integral with the body. To assure against any season cracking the outside sleeve may have a copper content between 95% and 99%. The lower limit is probably 85%. In some cases the differential in wall thickness of the sleeve parts may be only in the neighborhood of .008" to .010"; and the wall thickness may be made in any part desired without regard to thickening the walls of the other portions.

In some instances, for example in the ¾" coupling, the cylindrical wall of the sleeve may be .065" whereas the base wall 37 is .110". The thinness of the cylindrical wall is desirable for purposes of the two die contracting operations but it is not desirable to sacrifice strength of wall on this account. Therefore we propose to give the cylindrical part of the shell or sleeve 33 a final drawing operation after all other forming and annealing operations. Such final drawing operation is designed to give a sufficient pinch to the metal in that part of the shell that amounts to a physical change in the molecular structure of the metal. This pinching of the metals hardens the same and increases the tensile strength and therefore the thin cylindrical wall of the shell can be made as strong as the thicker end wall 37 of the same.

The sleeve 33 of the present application comes in continuous and uninterrupted contact as to all of its internal surface with the external surface of the hose which it holds under compression. This forms a complete continuity of tenacious effect between the rubber of the hose and the internal wall of the metal sleeve 33 which prevents any axial relative slippage of these two parts.

In some or possibly all cases the squeezed material of the rubber, elastic or deformable hose will swell radially outward at the first zone where it is unconfined by the shell cylinder or skirt 33 and we have attempted to indicate at 55 in Figs. 12 and 13 the observed bulge in the hose.

The initial die contracting operation has two functions; first, it may be a slight contraction but sufficient to cause the sleeve to be forced in back of the adjacent face of the nut section particularly in the regions of the nut corners to thus lock the sleeve to the coupling body and incidentally this reduction brings the diameter of the sleeve down approximately to the diameter of the hose to which the coupling is to be assembled; and secondly one of the advantages of the double die contracting operation is that it makes it much easier to reduce the coupling at the final assembly than if it had to go from its original diameter down to the diameter where it is die contracted on the hose for permanent assembly.

What is claimed is:

1. The herein-described method of manufacturing and assembling a malleable sleeve shell to a conventional form of coupling body comprising a threaded male end, a nipple end and an intermediate enlarged polygonal portion, which consists in drawing a hollow shell with an internal base flange in which the shell is of an initial inner diameter at least as large as that of the polygonal portion, axially sliding the shell over the coupling body from the male toward the nipple end with the base flange trailing and until the base flange abuts the adjacent end of the enlarged polygonal portion, and initially die contracting the shell sufficiently to interlock the shell with the other end of the enlarged portion but not enough to reduce the diameter of the shell below that of the external dimension of the hose to be received therein.

2. A method as described in claim 1 further characterized by the assembly of the coupling to a hose consisting in subjecting the shell to a final die contracting operation with a completely circular die moved from the free outer end of the shell toward the inner end to cause compression of the elastic body of the hose axially and the outward swelling of the displaced hose material at the ends of the contracted section.

3. The herein-described method of manufacturing a malleable sleeve, assembling same to a conventional hose coupling body comprising male and nipple ends with an enlarged polygonal portion between, and subsequently assembling the associated sleeve and coupling body upon a hose, which consists in drawing a sleeve shell of a malleable metal with a thin-walled contractile skirt cylinder, and relatively thick-walled polygonal and domed end portions, flattening and planishing the domed end portion and piercing the same to provide a base flange, axially sliding the sleeve over the coupling body until the base flange abuts an end of the enlarged polygonal portion and the skirt cylinder surrounds the nipple, initially die contracting the cylinder to a diameter smaller than that of the enlarged polygonal section but as large or larger than the external diameter of the elastic hose, inserting a hose over the nipple and within the cylinder, and finally die contracting the cylinder radially inward through a major portion of its axial length excepting adjacent the enlarged polygonal portion to an inner diameter smaller than that of the normal external dimension of the hose to cause elastic material of the hose to be displaced axially and into the large diameter of the cylinder adjacent the polygonal portion.

4. The method as herein described which consists in drawing a tubular shell of annealed metal of a relatively thin-walled cylinder and relatively thick-walled polygonal and domed end wall portions, flattening or planishing the thick domed end wall to rearrange the crystalline structure of the metal and force the stock into the angle between the end wall and polygonal portion, subjecting the shell to another drawing operation to produce nut faces in the polygonal portion, finish drawing the cylinder for pinching the cylindrical wall to impart strength, piercing the end wall to produce an opening and a base flange, sliding the shell on a coupling body until the base flange abuts one end wall of the coupling body, the polygonal portion fits upon the like portion of the coupling body and the cylinder surrounds the nipple of the coupling body, and die contracting the shell slightly to force the metal of the shell in back of the other end wall of the polygonal portion of the coupling body particularly in the regions of the nut corners.

5. The method as set out in claim 4 following by assembling the united coupling body and shell to a hose and further die contracting the shell on the hose.

6. The herein-described method of manufacturing and assembling a malleable sleeve shell to a conventional form of coupling body comprising a threaded end, a nipple end and an intermediate enlarged polygonal portion, which consists in drawing a hollow shell with a base flange in which the shell is of an initial inner diameter at least as large as that of the polygonal portion, axially sliding the shell over the coupling body from the threaded end toward the nipple and with the base flange trailing and until the base flange abuts the adjacent end of the enlarged polygonal portion as a stop, and initially die contracting said shell uniformly throughout its major length from its open end up to a point adjacent said body polygonal portion and to a diameter less than said polygonal portion, whereby said shell and body will be held together as a unit prior to the assembly of said unit to the end of a hose.

7. The herein-described method of manufacturing and assembling a malleable shell to a conventional form of coupling body comprising an enlarged portion and a nipple end, which consists in drawing a hollow shell with a base flange in which the shell is of an initial inner diameter at least as large as that of the body enlarged portion, axially sliding the shell over the coupling body toward the nipple end until the base flange abuts the adjacent face of the enlarged portion, and contracting a portion of the shell adjacent the opposite face of said body enlarged portion to an interior diameter less than said body enlarged portion so as to hold the shell and body together as a unit prior to the assembly of said unit to the end of a hose.

8. The herein-described method of manufacturing and assembling a malleable shell to a conventional form of coupling body comprising an enlarged polygonal portion and a nipple end which consists in drawing a cupped cylindrical shell, forming a portion of its wall adjacent the base of a polygonal shape complemental to said body polygonal portion and piercing out the base to provide a flange therein, axially sliding the shell over the coupling body toward the nipple end until the base flange abuts the adjacent face of said body polygonal portion and interfitting said complemental polygonal portions together, and uniformly contracting the cylindrical portion of said shell from the open end toward its polygonal section and to a point wherein said cylindrical portion of said shell will engage the corners of said body polygonal portion sufficient to rigidly secure the shell and body together as a unitary structure prior to the assembly upon the end of a hose.

ALBERT C. $\overset{\text{his}}{\times}$ LUSHER.
$\phantom{\text{ALBERT C. }}$mark
EMERSON H. TOMPKINS.
FREDERICK R. REUTTER.
GEORGE G. HOWARD.

Witness to Albert C. Lusher's mark:
CATHERINE A. DEELEY.